US012622551B2

(12) United States Patent
Schuster et al.

(10) Patent No.: US 12,622,551 B2
(45) Date of Patent: May 12, 2026

(54) NEUTRAL BUOYANCY SOLID WASTE CAPTURE TEST METHOD

(71) Applicant: Hamilton Sundstrand Space Systems International, Inc., Windsor Locks, CT (US)

(72) Inventors: Ashley Rose Himmelmann Schuster, Chicago, IL (US); Thao Hoang, Arlington, WA (US); Timothy Monson, Winnebago, IL (US)

(73) Assignees: HAMILTON SUNDSTRAND CORPORATION, Charlotte, NC (US); B/E AEROSPACE, INC., Winston Salem, NC (US)

( * ) Notice: Subject to any disclaimer, the term of this patent is extended or adjusted under 35 U.S.C. 154(b) by 318 days.

(21) Appl. No.: 18/408,319

(22) Filed: Jan. 9, 2024

(65) Prior Publication Data

US 2025/0221584 A1 Jul. 10, 2025

(51) Int. Cl.
*A47K 11/02* (2006.01)
*B64G 7/00* (2006.01)

(52) U.S. Cl.
CPC ................ *A47K 11/02* (2013.01); *B64G 7/00* (2013.01)

(58) Field of Classification Search
CPC ............. A47K 11/02; B64G 7/00; B64G 1/60
See application file for complete search history.

(56) References Cited

U.S. PATENT DOCUMENTS

| | | | |
|---|---|---|---|
| 7,380,292 B1 * | 6/2008 | Harris .................... | A47K 13/10 |
| | | | 4/213 |
| 2021/0404162 A1 * | 12/2021 | Gee .......................... | E03D 11/00 |
| 2024/0401322 A1 * | 12/2024 | Matsumoto .............. | E03D 9/10 |
| 2025/0257556 A1 * | 8/2025 | Schuster ................ | E03D 5/016 |

FOREIGN PATENT DOCUMENTS

| | | |
|---|---|---|
| CN | 108535067 A | 9/2018 |
| JP | 4544201 B2 | 7/2010 |

OTHER PUBLICATIONS

Autrey et al., "Development of the Universal Waste Management System" International Conference on Environmental Systems (Jul. 2020) pp. 1-10.
McKinley et al., "NASA Alternate Fecal Canister Development and Design for Exploration Missions" 2023 IEEE Aerospace Conference (Mar. 2023) pp. 1-11.
Payra et al., "Artemis Removable-Canister Waste Accumulation System & Handler (ARC-WASH): A Portable Modular Space Lavatory" IEEE Aerospace Conference (AERO) IEEE (Mar. 2022) pp. 1-16.
Search Report issued in European Patent Application No. 25151055. 8; Date of Mailing Jun. 18, 2025 (5 pages).

* cited by examiner

*Primary Examiner* — Toan N Pham
(74) *Attorney, Agent, or Firm* — CANTOR COLBURN LLP

(57) ABSTRACT

A commode test system for use in Earth's gravity field at Earth's surface is provided. The commode test system includes a commode disposed at Earth's surface, a blower to generate airflow into the commode, a gas-filled bolus having (Continued)

a neutral buoyancy in Earth's gravity field at Earth's surface and recording devices to record movements of the gas-filled bolus in the airflow relative to the commode.

20 Claims, 3 Drawing Sheets

NEUTRAL BUOYANCY SOLID WASTE CAPTURE TEST METHOD

BACKGROUND

The present disclosure relates to space toilets and, more particularly, to a neutral buoyancy solid waste capture test method for space toilets.

The International Space Station (ISS) is the largest modular space station in low Earth orbit. The station serves as a microgravity and space environment research laboratory in which scientific research is conducted in astrobiology, astronomy, meteorology, physics and other fields. The ISS is suited for testing spacecraft systems and equipment required for possible future long-duration missions to the Moon and Mars. The ISS is further suited for habitation by humans for prolonged durations and involves the use of multiple life support systems.

Accordingly, there remains a need for improved life support systems on the ISS as well as on spacecraft.

BRIEF DESCRIPTION

According to an aspect of the disclosure, a commode test system for use in Earth's gravity field at Earth's surface is provided. The commode test system includes a commode disposed at Earth's surface, a blower to generate airflow into the commode, a gas-filled bolus having a neutral buoyancy in Earth's gravity field at Earth's surface and recording devices to record movements of the gas-filled bolus in the airflow relative to the commode.

In accordance with additional or alternative embodiments, the gas-filled bolus includes an inflatable material and gas that inflates the inflatable material.

In accordance with additional or alternative embodiments, the inflatable material is provided as a balloon and the gas includes helium.

In accordance with additional or alternative embodiments, the gas-filled bolus further includes a coating to mimic a texture of a fecal deposit.

In accordance with additional or alternative embodiments, the gas-filled bolus is configured to mimic one or more predefined types of fecal deposits.

In accordance with additional or alternative embodiments, an injection apparatus injects the gas-filled bolus into the airflow.

In accordance with additional or alternative embodiments, the injection apparatus has a variable injection velocity for injecting the gas-filled bolus into the airflow.

In accordance with additional or alternative embodiments, the injection apparatus has a human body geometry.

According to an aspect of the disclosure, a method of testing a commode in Earth's gravity field at Earth's surface is provided. The method includes generating an airflow into a commode disposed at Earth's surface, positioning, in the airflow, a gas-filled bolus having a neutral buoyancy in Earth's gravity field at Earth's surface and recording movements of the gas-filled bolus in the airflow relative to the commode.

In accordance with additional or alternative embodiments, the method further includes forming the gas-filled bolus by inflating inflatable material with gas.

In accordance with additional or alternative embodiments, the inflatable material is provided as a balloon and the gas includes helium.

In accordance with additional or alternative embodiments, the method further includes coating the gas-filled bolus with a coating to mimic a texture of a fecal deposit.

In accordance with additional or alternative embodiments, the method further includes configuring the gas-filled bolus to mimic one or more predefined types of fecal deposits.

In accordance with additional or alternative embodiments, the positioning of the gas-filled bolus in the airflow includes injecting the gas-filled bolus into the airflow.

In accordance with additional or alternative embodiments, the method further includes varying an injection velocity of the injecting of the gas-filled bolus into the airflow.

In accordance with additional or alternative embodiments, the injecting of the gas-filled bolus into the airflow includes injecting the gas-filled bolus from an injection apparatus having a human body geometry.

According to an aspect of the disclosure, a method of testing a commode in Earth's gravity field at Earth's surface is provided. The method includes forming a gas-filled bolus by inflating inflatable material with gas to have a neutral buoyancy in Earth's gravity field at Earth's surface, generating an airflow into a commode disposed at Earth's surface, injecting the gas-filled bolus into the airflow from an injection apparatus having a human body geometry and recording movements of the gas-filled bolus in the airflow relative to the commode.

In accordance with additional or alternative embodiments, the inflatable material is provided as a balloon and the gas includes helium.

In accordance with additional or alternative embodiments, the method further includes coating the gas-filled bolus with a coating to mimic a texture of a fecal deposit and configuring the gas-filled bolus to mimic one or more predefined types of fecal deposits.

In accordance with additional or alternative embodiments, the method further includes varying an injection velocity of the injecting of the gas-filled bolus into the airflow.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Human waste collection in space (i.e., in the ISS or a spacecraft) is a necessary part of life support and is made challenging by the fact that the living environments in space are characterized as having a lack of gravity or microgravity. Given the lack of gravity, (hereinafter referred to as "zero G" or "0G") current systems for human waste collection direct waste into a commode using airflow, which is difficult to test with Earth's gravity. Indeed, to complete 0G capture effectiveness tests, systems for human waste collection typically undergo parabolic flight experiments, which can be expensive and which are often unavailable. Development programs need a cheaper and easier way to test waste capture effectiveness in a gravity field on Earth.

As will be described below, a weightless solid waste deposit simulant, or bolus is provided for use during commode testing in a gravity field on Earth to observe capture effectiveness in that gravity field on Earth. The weightless bolus is created by filling a shell with helium, with the shell and the helium having a total mass that allows for their neutral buoyancy to simulate weightlessness. The bolus can optionally be coated with a simulant coating that mimics the texture of a fecal deposit, considering typical textures and simulating the resulting drag forces. The simulant material could be similar to waste simulant used by airlines in commode testing. The bolus shell can be a balloon or an otherwise inflatable material or solid material.

Figure 1:
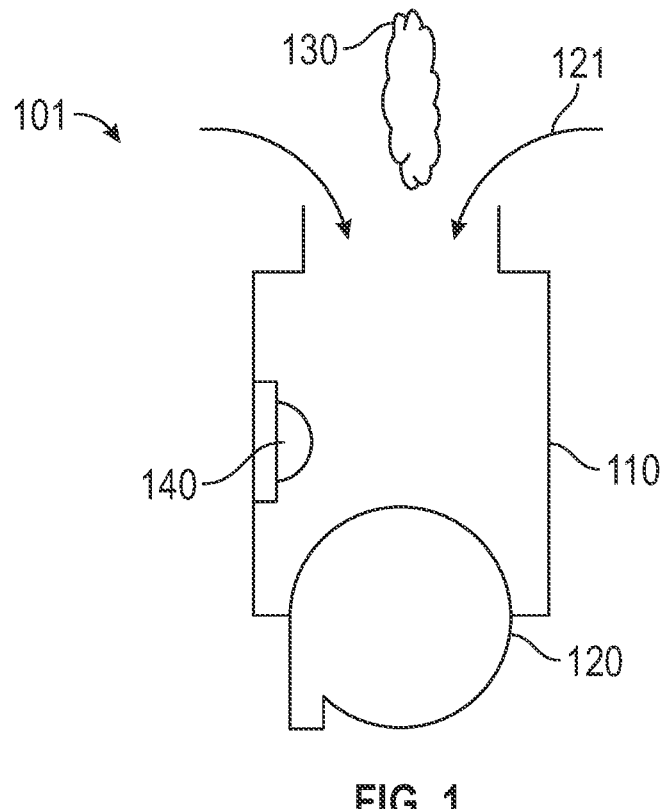
FIG. 1 is a side schematic view of a commode test system in accordance with embodiments.
Figure 2:
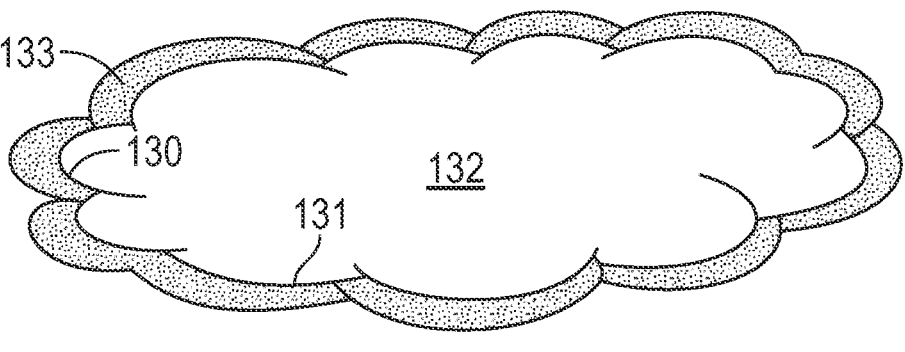
FIG. 2 is an illustration of a gas-filled bolus of the commode test system of FIG. 1 in accordance with embodiments.

With reference to FIGS. 1 and 2, a commode test system 101 is provided for use in Earth's gravity field at Earth's surface in order to mimic a performance of a human waste collection system in low gravity or microgravity. The commode test system 101 includes a commode 110, which is disposed at Earth's surface, a blower 120 to generate airflow 121 into an interior of the commode 110, a gas-filled bolus 130 having a neutral buoyancy in Earth's gravity field at Earth's surface and recording devices 140 to record movements of the gas-filled bolus 130 in the airflow 121 relative to the commode 110 and the interior of the commode 110.

In accordance with embodiments and as shown in FIG. 2, the gas-filled bolus 130 includes an inflatable material 131 and gas 132 that inflates the inflatable material 131. In accordance with further embodiments and as shown in FIG. 2, the inflatable material 131 can include or be provided as a balloon and the gas 132 can include helium or some other light inert gas. In some cases, the gas-filled bolus 130 can also include a coating 133 that is meant to mimic a texture of a fecal deposit.

In any case, the neutral buoyancy of the gas-filled bolus 130 serves to mimic the movement of a fecal deposit in orbit or a low/micro gravity embodiment though the gas-filled bolus remains on Earth's surface and subject to Earth's gravity at the Earth's surface. This allows for testing of the commode 110 and the effectiveness of the airflow 121 to drive a fecal deposit into the commode 110, which is generated by the blower 120, without a need for expensive and generally unavailable testing scenarios (i.e., a parabolic flight).

The gas-filled bolus 130 can be configured to mimic one or more predefined types of fecal deposits, such as those listed in the Bristol Stool Chart (i.e., see page 3 of https://www.nasa.gov/wp-content/uploads/2023/03/waste-management-technical-brief-ochmo.pdf). That is, the gas-filled bolus 130 can be configured as a separate hard lump, a sausage-shaped and lumpy mass, a sausage-shape and cracked mass, a smooth and soft sausage-shaped mass, a soft blob with clear cut edges, a fluffy piece with ragged edges and a watery mass with no solid pieces. In some cases, the gas-filled bolus 130 can be provided in plural numbers for a single test scenario in which the plural gas-filed boluses 130 are all configured similarly or for a single test scenario in which the plural gas-filled boluses 130 are configured differently.

Figure 3:
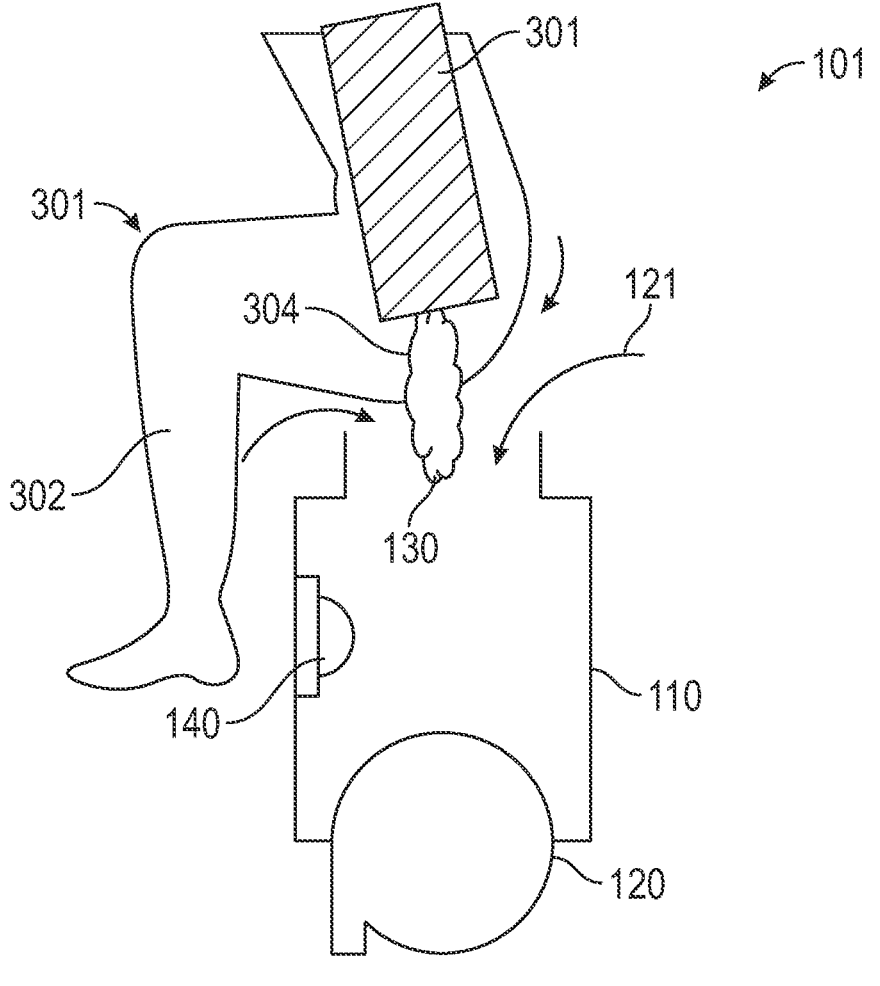
FIG. 3 is a side schematic view of a commode test system with an injection apparatus in accordance with embodiments.

With reference to FIG. 3, the commode test system 101 can further include an injection apparatus 301 that is disposed and configured to inject the gas-filled bolus 130 into the airflow 121. The injection apparatus 301 can include a dispensing element 302 which can provide for a variable injection velocity for injecting the gas-filled bolus 130 into the airflow 121 so as to mimic various conditions in which a fecal deposit is made by various types of individuals. In accordance with embodiments, the injection apparatus 301 can have a human body geometry 303 (i.e., as used herein, a definition for a human body geometry can be found in https://www.nasa.gov/wp-content/uploads/2020/10/2022-04-08_nasa-std-3001_vol_2_rev_c_final.pdf) with an orifice 304 simulating a human sphincter.

Figure 4:
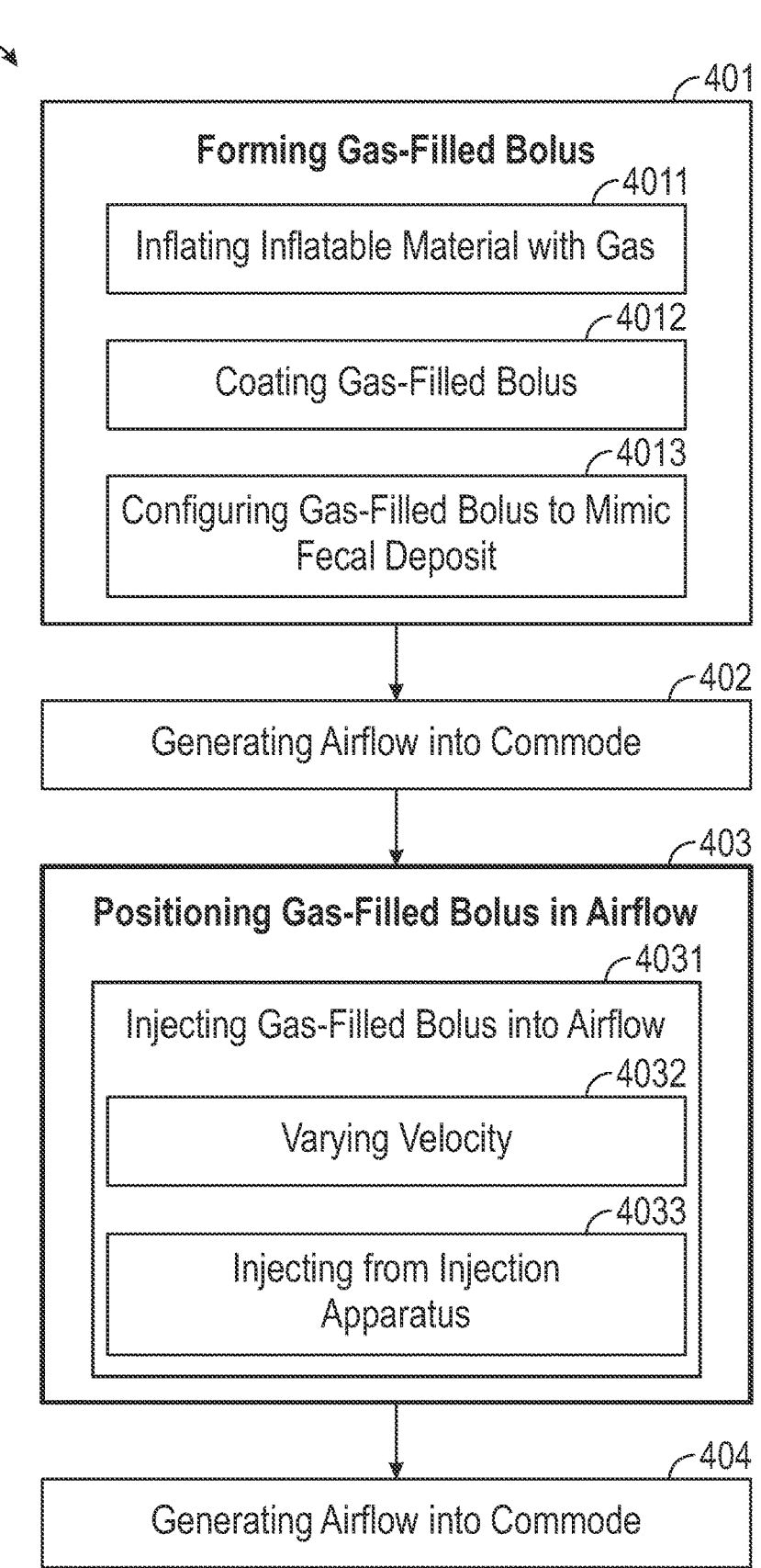
FIG. 4 is a flow diagram illustrating a method of testing a commode in Earth's gravity field at Earth's surface.

With reference to FIG. 4, a method 400 of testing a commode, such as the commode 110 and the airflow 121 of FIGS. 1-3, in Earth's gravity field at Earth's surface is provided. As shown in FIG. 4, the method 400 includes forming a gas-filled bolus having a neutral buoyancy in Earth's gravity field at Earth's surface (block 401) by inflating inflatable material, such as balloon material, with gas, such as helium (block 4011), by optionally coating the gas-filled bolus with a coating to mimic a texture of a fecal deposit (block 4012) and by optionally configuring the gas-filled bolus to mimic one or more predefined types of fecal deposits (block 4013). The method 400 further includes generating an airflow into a commode disposed at Earth's surface (block 402), positioning the gas-filled bolus in the airflow (block 403) and recording movements of the gas-filled bolus in the airflow relative to the commode (block 404). The positioning of the gas-filled bolus in the airflow of block 403 can include injecting the gas-filled bolus into the airflow (block 4031) while optionally varying an injection velocity (block 4032) and while optionally executing the injecting from an injection apparatus having a human body geometry (block 4033).

Technical effects and benefits of the present disclosure are the facilitation of the development of space toilet technologies that allow for capture effectiveness testing. Implementing the method and systems disclosed herein in test planning would allow for fast and agile modification of flow settings and geometries of the commode, supporting the required rapid development of the product while increasing confidence in capture effectiveness. This testing will benefit customers and end users by increasing confidence in system performance prior to launch.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A commode test system for use in Earth's gravity field at Earth's surface, the commode test system comprising:
    a commode disposed at Earth's surface;
    a blower to generate airflow into the commode;
    a gas-filled bolus having a neutral buoyancy in Earth's gravity field at Earth's surface; and
    recording devices to record movements of the gas-filled bolus in the airflow relative to the commode.

2. The commode test system according to claim 1, wherein the gas-filled bolus comprises an inflatable material and gas that inflates the inflatable material.

3. The commode test system according to claim 2, wherein the inflatable material is provided as a balloon and the gas comprises helium.

4. The commode test system according to claim 1, wherein the gas-filled bolus further comprises a coating to mimic a texture of a fecal deposit.

5. The commode test system according to claim 1, wherein the gas-filled bolus is configured to mimic one or more predefined types of fecal deposits.

6. The commode test system according to claim 1, further comprising an injection apparatus to inject the gas-filled bolus into the airflow.

7. The commode test system according to claim 6, wherein the injection apparatus has a variable injection velocity for injecting the gas-filled bolus into the airflow.

8. The commode test system according to claim 6, wherein the injection apparatus has a human body geometry.

9. A method of testing a commode in Earth's gravity field at Earth's surface, the method comprising:
    generating an airflow into a commode disposed at Earth's surface;
    positioning, in the airflow, a gas-filled bolus having a neutral buoyancy in Earth's gravity field at Earth's surface; and
    recording movements of the gas-filled bolus in the airflow relative to the commode.

10. The method according to claim 9, further comprising forming the gas-filled bolus by inflating inflatable material with gas.

11. The method according to claim 10, wherein the inflatable material is provided as a balloon and the gas comprises helium.

12. The method according to claim 9, further comprising coating the gas-filled bolus with a coating to mimic a texture of a fecal deposit.

13. The method according to claim 9, further comprising configuring the gas-filled bolus to mimic one or more predefined types of fecal deposits.

14. The method according to claim 9, wherein the positioning of the gas-filled bolus in the airflow comprises injecting the gas-filled bolus into the airflow.

15. The method according to claim 14, further comprising varying an injection velocity of the injecting of the gas-filled bolus into the airflow.

16. The method according to claim 14, wherein the injecting of the gas-filled bolus into the airflow comprises injecting the gas-filled bolus from an injection apparatus having a human body geometry.

17. A method of testing a commode in Earth's gravity field at Earth's surface, the method comprising:
    forming a gas-filled bolus by inflating inflatable material with gas to have a neutral buoyancy in Earth's gravity field at Earth's surface;
    generating an airflow into a commode disposed at Earth's surface;
    injecting the gas-filled bolus into the airflow from an injection apparatus having a human body geometry; and
    recording movements of the gas-filled bolus in the airflow relative to the commode.

18. The method according to claim 17, wherein the inflatable material is provided as a balloon and the gas comprises helium.

19. The method according to claim 17, further comprising:
    coating the gas-filled bolus with a coating to mimic a texture of a fecal deposit; and
    configuring the gas-filled bolus to mimic one or more predefined types of fecal deposits.

20. The method according to claim 17, further comprising varying an injection velocity of the injecting of the gas-filled bolus into the airflow.

* * * * *